United States Patent [19]

Imai et al.

[11] 4,332,187
[45] Jun. 1, 1982

[54] AIR INTAKE HOUSING

[75] Inventors: Eiji Imai, Yokohama; Kazuaki Omote, Fujisawa, both of Japan

[73] Assignee: Nissan Motor Company, Ltd., Yokohama, Japan

[21] Appl. No.: 149,872

[22] Filed: May 14, 1980

[30] Foreign Application Priority Data

May 16, 1979 [JP] Japan .................... 54/65064[U]

[51] Int. Cl.³ .............................................. B60H 1/28
[52] U.S. Cl. .......................................... 98/2.17; 98/2; 296/192; 296/208
[58] Field of Search .................. 98/2, 2.07, 2.11, 2.16, 98/2.17; 296/192, 194, 208; 174/47

[56] References Cited

U.S. PATENT DOCUMENTS

| | | | |
|---|---|---|---|
| 2,525,086 | 10/1950 | Wright et al. | 174/47 X |
| 2,550,021 | 4/1951 | Rappl | 174/47 |
| 2,852,997 | 9/1958 | Leslie et al. | 98/2.17 |
| 2,975,696 | 3/1961 | Jewell | 296/208 X |
| 3,084,972 | 4/1963 | Gibson et al. | 296/208 |
| 3,289,564 | 12/1966 | Castelet | 98/2.07 |
| 4,078,840 | 3/1978 | Itoh | 98/2.16 |

FOREIGN PATENT DOCUMENTS

| | | | |
|---|---|---|---|
| 732875 | 6/1955 | United Kingdom | 296/192 |
| 268197 | 4/1970 | U.S.S.R. | 296/192 |

Primary Examiner—Albert J. Makay
Assistant Examiner—Harold Joyce
Attorney, Agent, or Firm—Thompson, Birch, Gauthier & Samuels

[57] ABSTRACT

An automotive air intake housing for introducing fresh air into an air conditioner includes a cowl box and an air box through which the fresh air passes, a dash side panel having two openings, one for communicating the cowl box with the air box and the other for communicating the air box with the air conditioner, and a wiring harness passing through the air box between the engine and passenger compartments. Since the wiring harness does not pass directly through the automobile firewall, but rather circumvents it by passing through the air intake housing, engine noise entering the passenger compartment is thereby reduced.

9 Claims, 8 Drawing Figures

AIR INTAKE HOUSING

BACKGROUND OF THE INVENTION

This invention relates to a vehicle body, and in particular relates to an improved air intake housing for introducing fresh air through a cowl box into an air conditioner for an automotive vehicle.

FIGS. 1 and 2 illustrate a conventional construction of a cowl box 1 arranged onto a vehicle body. The cowl box 1 includes a dash upper panel 2 connected to the upper edge of a dash lower panel 4 and a cowl top panel 3 joined to the dash upper panel 2. An air inlet or intake opening 6 is formed in the top portion of the cowl top panel 3. Also, a second air inlet 7 is formed in the dash upper panel 2. A blower 9 of an air conditioner 8 is connected to the air inlet 7 so that the air can be directly introduced from the cowl box 1 into the air conditioner. A drain hole 10 is formed at both side edges of the cowl box 1, as is illustrated, to drain any water such as rain and cleaning water that comes into the cowl box 1 through the air intake opening 6. A hood ledge panel 11 is provided as a side wall of an engine compartment 12. The numeral 13 denotes a front pillar.

In the conventional structure, however, air is directly introduced from the cowl box 1 into the air conditioner 8. Therefore, when the sound level of the air flowing through the cowl box 1 becomes high at high speeds, the leakage and transmission of the noise or increased sound near the air inlet 7 disturbs the quiet within the passenger compartment. As shown in FIG. 2, a flange 7a is formed at the periphery of the air inlet 7 in order to prevent the water from flowing thereinto. However, the flange 7a is not effective against the spattered water that sometimes comes into the air conditioner 8 together with the air. In order to solve such a problem, a complicated sealing construction must be provided.

In general, various wire harnesses pass through the engine compartment 12 and the passenger compartment 14 for the purpose of electrically connecting the parts arranged in the engine compartment 12 with the parts arranged within the passenger compartment 14. As a harness 15 penetrates the dash lower panel 4, the noise or sound coming from the engine compartment 12 is easily transmitted and leaked through the clearance between the harness 15 and the dash lower panel 4. Thus, it is extremely difficult to keep the passenger compartment quiet at high speeds.

FIGS. 3 and 4 show another conventional structure for introducing air into an air conditioner 8. An air box panel 17 is attached to the outer side of the dash side panel 16 so as to form an air box 18 which communicates with the cowl box 1. An air inlet 19 is formed in a portion of the dash side panel 16 facing the air box 18 so as to introduce the air through the air box 18 into the air conditioner 8. According to such a construction, there is a reasonable distance between the air inlet or intake opening 6 of the cowl box 1 and the air inlet 19 of the air box 18. The increased sound level at high speeds is lowered while the air flows through an air intake passage within the cowl box and the air box 18 and the noise in the passenger compartment is reduced to a greater extent than with the structure shown in FIGS. 1 and 2. However, as the harness 15 penetrates the dash lower panel 4, the leakage and transmission of the engine noise can not be completely prevented. Also, a drain duct 20 is independently placed in the air box 18 in order to drain the water at the lower portion of the air box 18. Consequently, the layout of those members becomes complicated. In addition, it is necessary to seal completely the joint portion between the drain duct 20 and the air box 18.

SUMMARY OF THE INVENTION

An object of the present invention is to provide an air intake housing which reduces the noise of the air flowing through the cowl box at high speeds, and the leakage and transmission of engine noise from the engine compartment.

According to the present invention, an air intake housing for introducing fresh air into an air conditioner includes a cowl box and an air box through which the fresh air passes, a dash side panel having two openings, one for communicating the cowl box with the air box and the other for communicating the air box with the air conditioner, and a harness passing through the air box between the engine and passenger compartments.

BRIEF DESCRIPTION OF THE DRAWINGS

A preferred embodiment of the present invention will be described with reference to the accompanying drawings in which.

DETAILED DESCRIPTION OF THE PREFERRED EMBODIMENT

Figure 1:
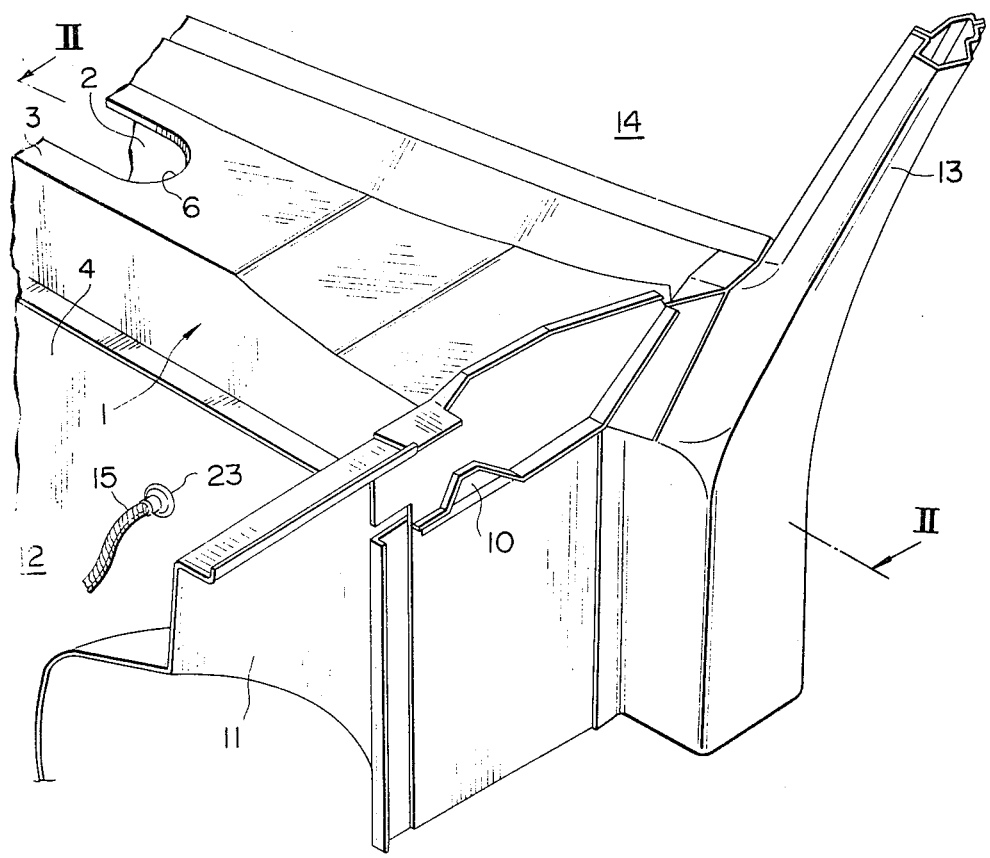
FIG. 1 is a perspective view showing a conventional structure for introducing air into an air conditioner through a cowl box in an automotive vehicle.
Figure 2:
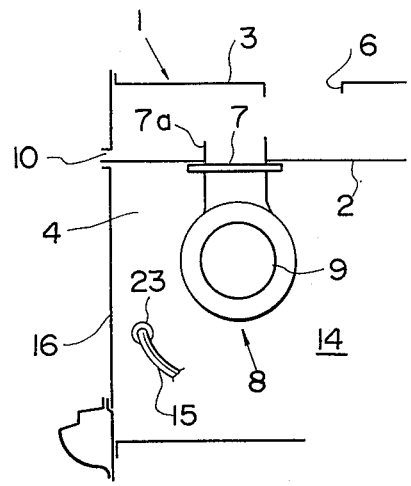
FIG. 2 is a sectional view taken along the line II—II in FIG. 1.
Figure 3:
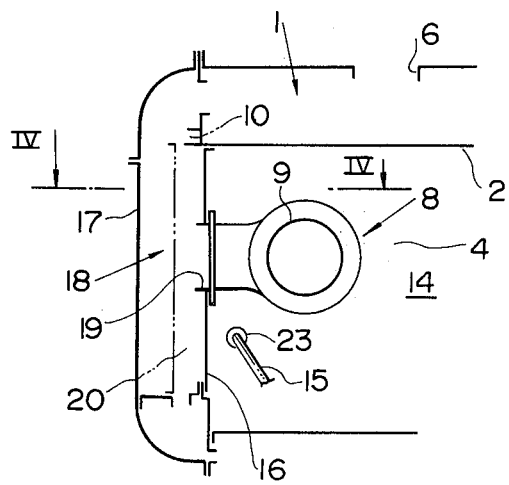
FIG. 3 is a sectional view similar to FIG. 2, showing a further structure for introducing air into an air conditioner through a cowl box in an automotive vehicle.
Figure 4:
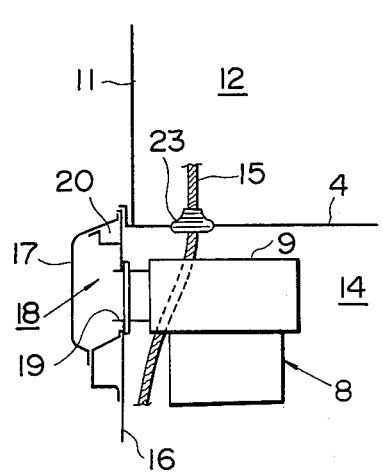
FIG. 4 is a sectional view taken along the line IV—IV in FIG. 3.
Figure 5:
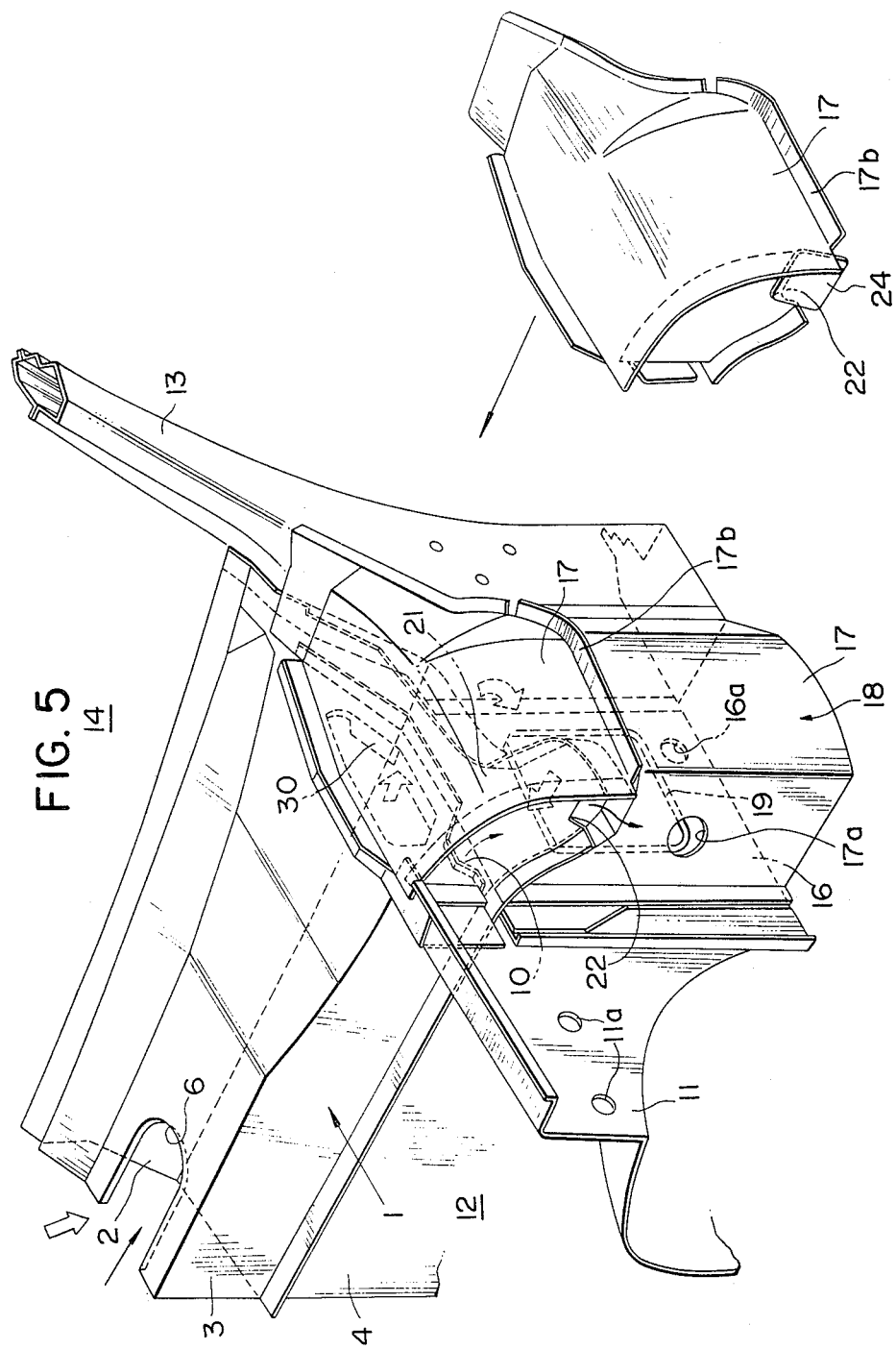
FIG. 5 is a perspective view illustrating an air intake housing for introducing air into an air conditioner through a cowl box in an automotive vehicle according to a preferred embodiment of the present invention.
Figure 6:
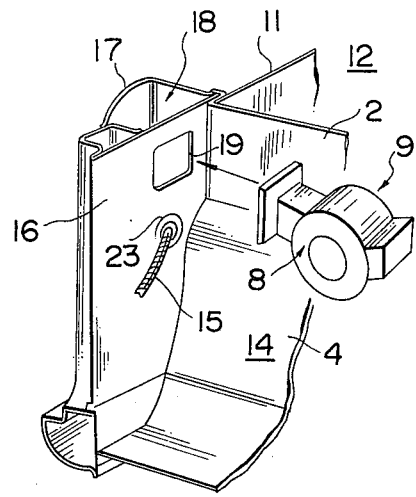
FIG. 6 is a perspective view showing an air box and its related members, some parts being omitted for clarity.
Figure 8:
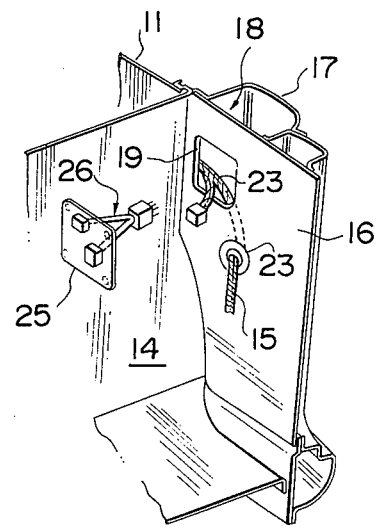
FIG. 8 is a perspective view of a further air box and its related members with some parts being broken away and omitted for clarity.

Referring now to FIGS. 5 through 8, a cowl box 1 is provided on a vehicle body in a conventional manner. The cowl box 1 is composed of a dash upper panel 2 and a cowl top panel 3. The dash upper panel 2 is connected to the upper edge of a dash lower panel 4 by flange means so as to separate a passenger compartment 14 from the engine compartment 12. The cowl top panel 3 is joined to the dash upper panel 2 to form the cowl box 1. An air inlet or intake opening 6 is formed in the top portion of the cowl top panel 3 so as to introduce fresh air into the cowl box 1. A drain opening 10 is formed in an end portion of the cowl box 1 to drain the water coming through the air inlet 6. A hood ledge 11 is provided as a sidewall of the engine compartment 12. An air box panel 17 is attached to the outer side of a dash side panel 16 to form an air box 18. The air box panel 17 is composed of upper and lower panels which are joined to each other by flange means at 17b. Two openings 19 and 30 formed in the dash side panel 16 face the air box 18. As shown in FIG. 6, an air blower 9 of an air conditioner 8 which is positioned in the passenger compartment 14 is connected to the lower opening 19. The air coming through the air inlet 6 into the cowl box 1 flows through the upper opening 30, the air box 18 and the lower opening 19 into the air blower 9 of the air conditioner 8 as shown by the arrows in FIG. 5.

Figure 7:
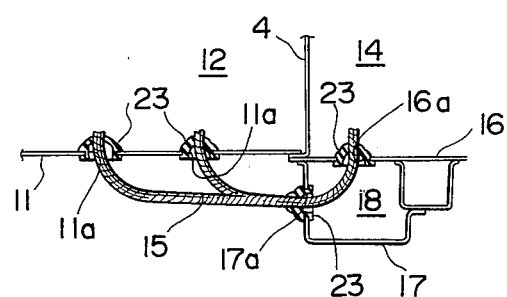
FIG. 7 shows a harness arrangement contained in the housing shown in FIG. 5.

A harness 15 passes through holes 17a, 16a and 11a formed in the front side of the air box panel 17, the dash side 16 and the hood ledge panel 11, respectively, as best shown in FIG. 7, so that the harness 15 bypasses the dash lower panel 4 and is threaded through the air box 18 from the engine compartment 12 into the passenger compartment 14. In the embodiment shown in FIG. 5, the hole 16a for the harness 15 is positioned below the lower opening 19. The holes 11a and 17a are located a little above the hole 16a.

The preferred embodiment of the present invention includes a gromet 23 which is composed of a resilient or elastic material, such as a rubber, and is fitted in each hole 11a, 16a and 17a around the harness 15 so as to ensure the sealing and soundproofing of the engine compartment.

The outward end of the dash upper panel 2 projects outwardly from the dash side panel 16 and is bent upwardly at its outer edge so as to form a collector or guide 21 for draining the water coming through the drain opening 10 from the cowl box 1 near a point where the cowl box 1 communicates with the air box 18. The bottom of the guide 21 is connected to a drain opening 22 formed in a front portion of the air box panel 17 and in particular at the lower edge of the lower panel of the air box panel 17. Thus, the water such as rain and cleaning water coming into the cowl box 1 can flow through the drain opening 10 along the guide 21 and be then drained through the drain opening 22.

It is preferable that a one-way valve 24 be provided at the drain opening 22 to allow the water to be drained through the drain opening 22 but prevent the water from flowing back into the air box 18. Such a one-way valve 24 also functions to insulate the hot air and engine noise coming from the engine compartment 12.

An air box 18 and its related members as stated above can be provided on both sides of the vehicle body. In such a case, the blower 9 of the air conditioner 8 is selectively attached to either the right or left dash side panels 16, depending on the type of vehicle body. The air inlet 19 to which the blower 9 of the air conditioning unit 8 is not attached is fitted with a cover 25. Some desired electric parts 26 or similar parts can be attached on the backside of the cover 25 and housed within the air box 18. Thus, the air box 18 can be more effectively used.

According to the present invention, air comes into the cowl box 1 and flows through the long air intake passage of the cowl box 1 and air box 18 into the air inlet of the dash side panel 16 to which the blower 9 of the air conditioning unit 8 is attached. Even if the noise of the air flowing through the cowl 1 box increases at high speeds, it is attenuated by the air flowing through the air box 18. As a result, the sound or noise is reduced and reasonably prevented from leaking into the passenger compartment. Also, since the harness 15 bypasses the dash lower panel 4 and passes through the air box 18 in order to electrically connect the engine compartment 12 and passenger compartment 14, engine noise is reduced and reasonably prevented from leaking into the passenger compartment. In addition, the water coming into the cowl box 1 is collected by the guide 21 and drained through the drain opening 22 at the front portion of the air box, thereby preventing the water from entering into the air conditioner 8.

What is claimed is:

1. In combination, an air intake housing and harness arrangement for an automotive vehicle having a passenger compartment and an engine compartment, the air intake housing configured to introduce fresh air into an air conditioner through its blower, the harness arranged to provide electrical connection between the engine and passenger compartments, said arrangement comprising:

a dash side panel provided at either side of the automotive vehicle;

a dash lower panel and a dash upper panel for separating the engine compartment from the passenger compartment, the dash upper panel being joined to an upper edge of the dash lower panel;

a cowl top panel joined to the dash upper panel so as to form a cowl box, the cowl top panel having an air inlet at its top portion for introducing fresh air thereinto;

an air box panel attached to an outer side of the dash side panel so as to form an air box;

a hood ledge panel provided as a sidewall of the engine compartment;

the dash side panel having a first opening for communicating the cowl box with the air box and a second opening for communicating the air box with the blower of the air conditioner to form an air intake passage within the cowl box and the air box from the air inlet of the cowl box to the blower of the air conditioner so that the noise of air flowing through the air intake passage can be reduced; and a harness bypassing the dash lower panel and passing through the dash side panel, the air box panel of the air box and the hood ledge panel to provide electrical connection between the engine compartment and passenger compartment so as to reduce leakage of engine noise into the passenger compartment.

2. The arrangement of claim 1 wherein an end of the dash upper panel extends into the air box and is bent downwardly along its edge so as to form a guide for collecting water from the cowl box and guiding the same to a drain opening formed in a portion of the air box panel so that the water can drain through the drain opening.

3. The housing of claim 2, wherein the air box panel comprises an upper panel and a lower panel, the drain opening being located at a joint portion of the upper and lower panels.

4. The housing of claim 2, including a one-way valve provided at the drain opening for preventing the water from flowing back into the air box.

5. In combination, an air intake housing and harness arrangement for an automotive vehicle having a passenger compartment and an engine compartment, the air intake housing configured to introduce fresh air into an air conditioning unit, the harness arranged to provide electrical connection between the passenger and engine compartments, the arrangement comprising: a cowl box and an air box for introducing fresh air therethrough, a dash side panel having two openings, one for communicating the cowl box with the air box and the other for communicating the air box with the air conditioner, a hood ledge panel provided as a sidewall of the engine compartment, means provided in the air box for guiding water from the cowl box into a drain opening formed in a portion of the air box so as to drain water of the air box through the guiding means, and a harness passing through holes formed in the air box panel, the dash side panel and the hood ledge panel, so that the harness passes through the air box between the engine and passenger compartments.

6. The housing of claim 5, wherein a grommet is fitted in each of the holes formed in the air box panel, the dash side panel and the hood ledge panel.

7. The housing of claim 1 or 5, wherein an air box is formed at both sides of the vehicle body, the air conditioner being connected to one of the air boxes.

8. The housing of claim 1, wherein the other opening in the dash side panel for the other of the air boxes is fitted with a cover.

9. In a motor vehicle having an engine compartment separated from a passenger compartment by a dash lower panel joined to a dash upper panel, with one side of said engine compartment being defined by a hood ledge panel arranged contiguously with a dash side panel on the same side of said passenger compartment, an air intake housing and associated harness arrangement comprising: a cowl upper panel cooperating with said dash upper panel to define a cowl box into which fresh air is admitted via an intake port; an air box panel cooperating with said dash side panel to define an air box communicating with said cowl box, said air box providing a fresh air path leading from said inlet port to a delivery port in said dash side panel; and a harness for providing an electrical connection between said engine and passenger compartments, said harness being arranged to bypass said dash lower panel by being threaded from said passenger compartment into said air box through an opening in said dash side panel, and from said air box into said engine compartment through additional openings in said air box panel and said hood ledge panel.

* * * * *

UNITED STATES PATENT AND TRADEMARK OFFICE
CERTIFICATE OF CORRECTION

PATENT NO. : 4,332,187
DATED : June 1, 1982
INVENTOR(S) : Eiji Imai and Kazuaki Omote It is certified that error appears in the above-identified patent and that said Letters Patent are hereby corrected as shown below:

Claim 8, col. 5, line 14, after "claim", delete "1" and insert --7--.

Signed and Sealed this

Tenth Day of August 1982

[SEAL]

Attest:

Attesting Officer

GERALD J. MOSSINGHOFF
Commissioner of Patents and Trademarks